United States Patent
Gibson et al.

(10) Patent No.: US 9,452,748 B2
(45) Date of Patent: Sep. 27, 2016

(54) METHODS AND SYSTEMS FOR IMPROVING HYBRID VEHICLE TRANSMISSION SHIFTING

(71) Applicant: Ford Global Technologies, LLC, Dearborn, MI (US)

(72) Inventors: Alexander O'Connor Gibson, Ann Arbor, MI (US); Jeffrey Allen Doering, Canton, MI (US); Seunghoon Lee, Northville, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 14/448,944

(22) Filed: Jul. 31, 2014

(65) Prior Publication Data

US 2016/0031432 A1    Feb. 4, 2016

(51) Int. Cl.
| B60W 10/08 | (2006.01) |
| B60W 10/02 | (2006.01) |
| B60W 10/06 | (2006.01) |
| B60W 10/11 | (2012.01) |
| B60W 20/00 | (2016.01) |
| B60W 30/19 | (2012.01) |

(52) U.S. Cl.
CPC .............. *B60W 10/02* (2013.01); *B60W 10/06* (2013.01); *B60W 10/08* (2013.01); *B60W 10/11* (2013.01); *B60W 20/108* (2013.01); *B60W 30/19* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| 6,176,808 | B1 * | 1/2001 | Brown ................... | B60K 6/365 |
| | | | | 180/65.25 |
| 7,632,213 | B2 | 12/2009 | Disch-Simon et al. | |
| 2003/0019313 | A1 * | 1/2003 | Ibamoto ................... | B60K 6/48 |
| | | | | 74/339 |
| 2007/0080005 | A1 * | 4/2007 | Joe ........................... | B60K 6/48 |
| | | | | 180/65.245 |
| 2011/0174559 | A1 * | 7/2011 | Saito ........................ | B60K 6/48 |
| | | | | 180/65.27 |
| 2012/0083385 | A1 | 4/2012 | Smith et al. | |
| 2012/0323418 | A1 | 12/2012 | Sah et al. | |
| 2014/0303825 | A1 * | 10/2014 | Tsuda ................... | B60W 10/115 |
| | | | | 701/22 |

OTHER PUBLICATIONS

O'Connor Gibson, Alexander et al., "Methods and System for Improving Hybrid Vehicle Gear Shifting," U.S. Appl. No. 14/523,454, filed Oct. 24, 2014, 42 pages.
Gibson, Alex et al., "Modeling and Analysis of Engine Torque Modulation for Shift Quality Improvement," SAE Technical Paper Series No. 2006-01-1073, 2003 SAE World Congress, Detroit, MI., Apr. 3-6, 2006, 14 pages.

* cited by examiner

*Primary Examiner* — Justin Holmes
(74) *Attorney, Agent, or Firm* — David Kelley; Alleman Hall McCoy Russell & Tuttle LLP

(57) ABSTRACT

Systems and methods for improving hybrid vehicle shifting are presented. Specifically, torque supplied to an input shaft of a transmission may be adjusted during torque and inertia phases of a transmission gear shift. The torque supplied to the transmission input shaft may be increased or decreased based on the shift and the shift phase.

20 Claims, 5 Drawing Sheets

METHODS AND SYSTEMS FOR IMPROVING HYBRID VEHICLE TRANSMISSION SHIFTING

FIELD

The present description relates to a system and methods for improving shifting of a stepped ratio transmission of a hybrid vehicle. The methods may be particularly useful for hybrid vehicles that include an electric motor or generator that may be selectively coupled to an engine.

BACKGROUND AND SUMMARY

A hybrid vehicle may be configured with an engine, a driveline disconnect clutch, a driveline integrated starter/generator DISG, and a dual mass flywheel positioned upstream of a transmission. The driveline configuration allows the engine and DISG to operate separately or together to propel the vehicle and store the vehicle's kinetic energy as electrical energy to propel the vehicle at a later time. The driveline configuration may provide versatility during a variety of driving conditions; however, the driveline configuration may have an increased inertia as compared to drivelines that only include an engine and transmission. The increased inertia is upstream of a transmission at a location where it may affect transmission shifting. In particular, the increased inertia may cause torque disturbances during transmission shifting.

The inventors herein have recognized the above-mentioned disadvantages and have developed a driveline method, comprising: in response to a transmission gear shift request, increasing transmission input shaft torque via an electric machine when electric machine speed is less than a threshold speed during a torque phase of the transmission gear shift; and decreasing transmission input shaft torque via slipping a driveline disconnect clutch during an inertia phase of the transmission gear shift.

By increasing torque supplied to a transmission input shaft via an electric machine when electric machine speed is less than a threshold speed during a torque phase of a gear shift, it may be possible to provide the technical result of improving smoothness of transmission shifting. Further, controlled slip may be applied to a driveline disconnect clutch to reduce torque applied to the transmission input shaft during an inertia phase of the gear shift to reduce driveline torque disturbances. Thus, by controlling torque applied to the transmission input shaft during a shift torque phase using a first torque control device and torque applied to the transmission input shaft during the shift's inertia phase using a second torque control device, it may be possible to improve shift smoothness in a way that is improved as compared to a method that attempts to improve transmission shifting via a single torque control device.

The present description may provide several advantages. In particular, the approach may improve driveline shift performance consistency. Further, the approach may reduce driveline torque disturbances. Further still, the approach may reduce degradation of driveline components by sharing torque control tasks amongst several torque control devices.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
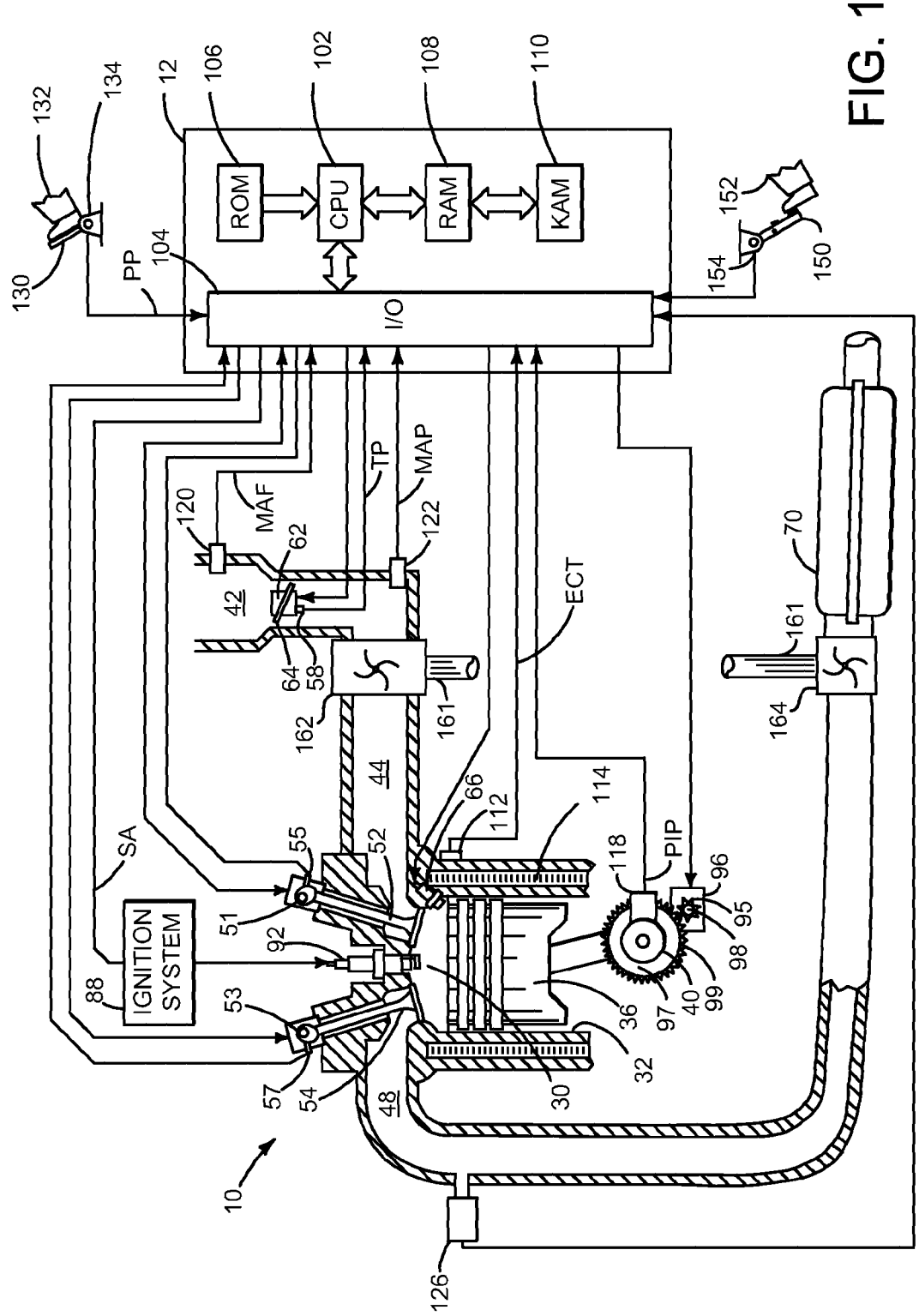
FIG. 1 is a schematic diagram of an engine.
Figure 2:
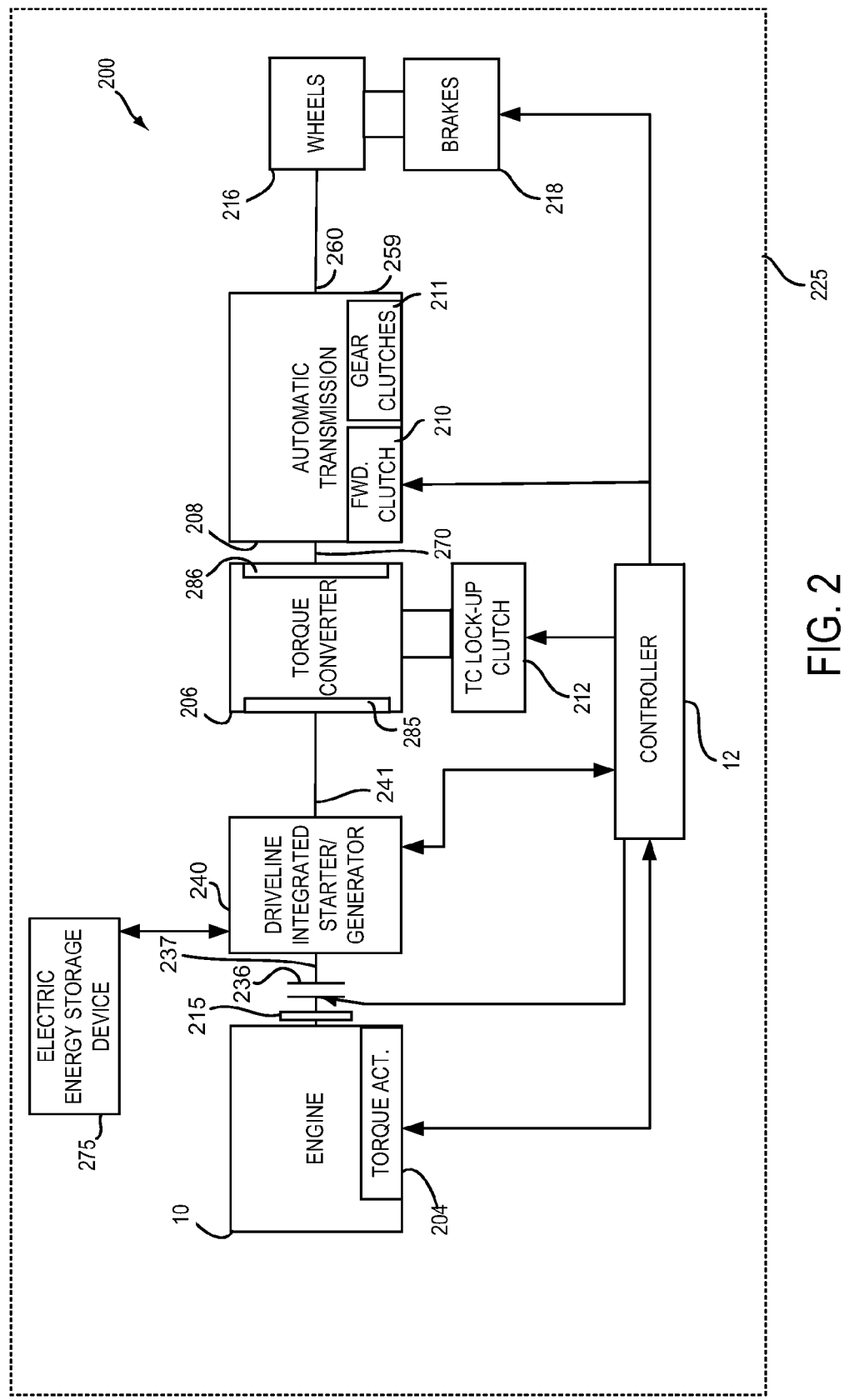
FIG. 2 shows an example vehicle driveline configuration.
Figure 3:
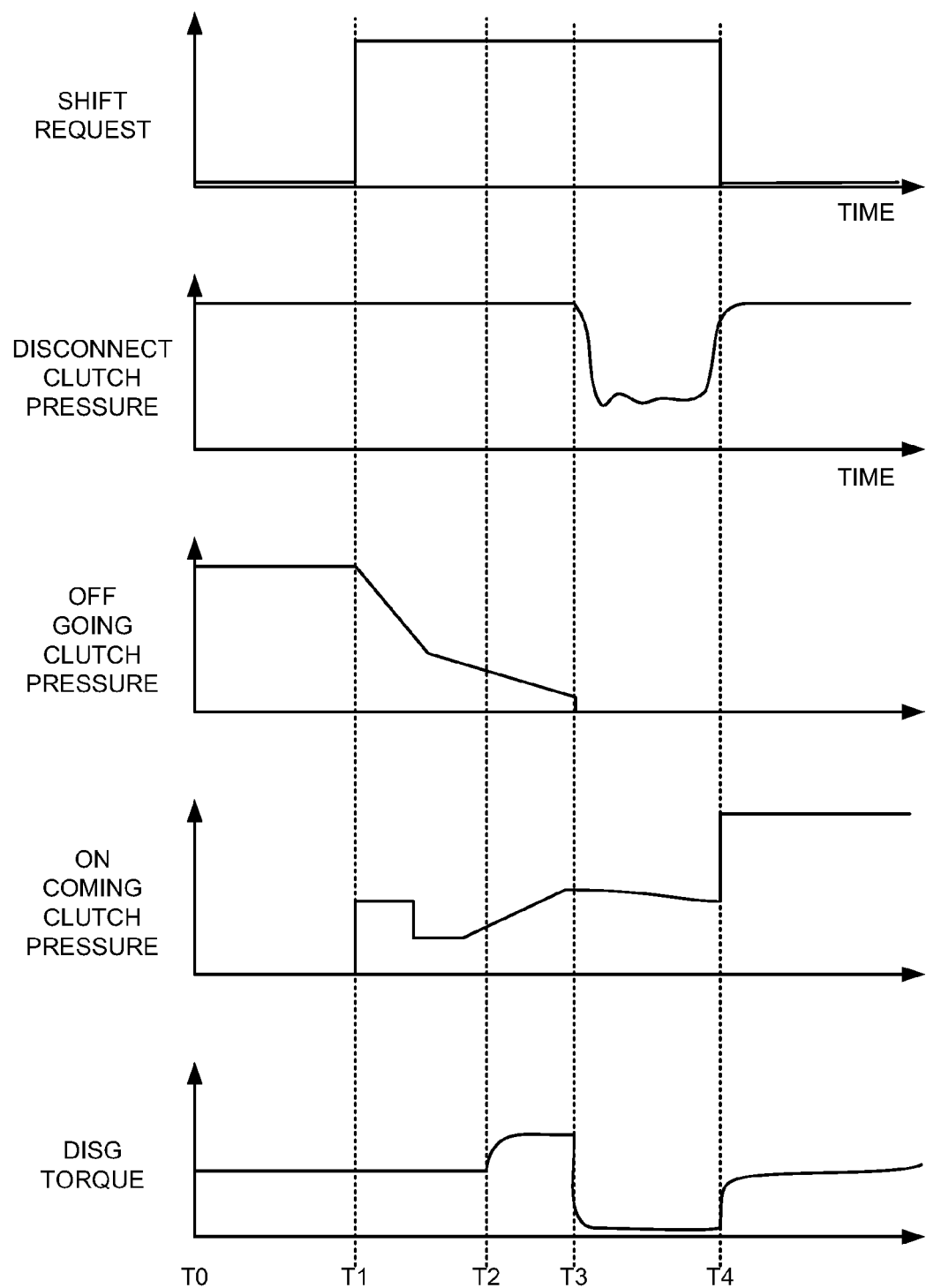
FIG. 3 shows an example transmission shifting sequence.
Figure 4:
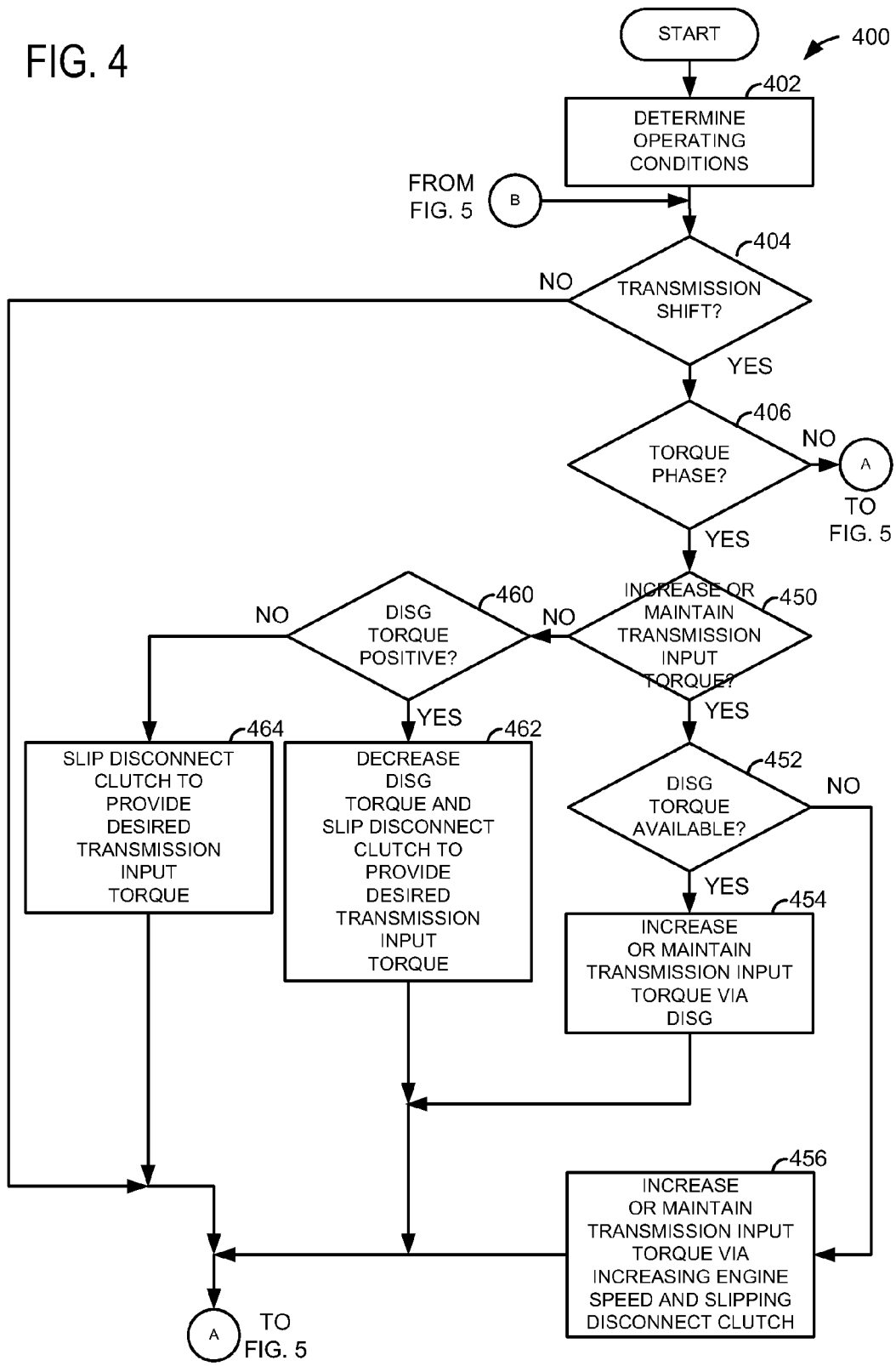
FIGS. 4 and 5 show an example method for improving transmission shifting.
Figure 5:
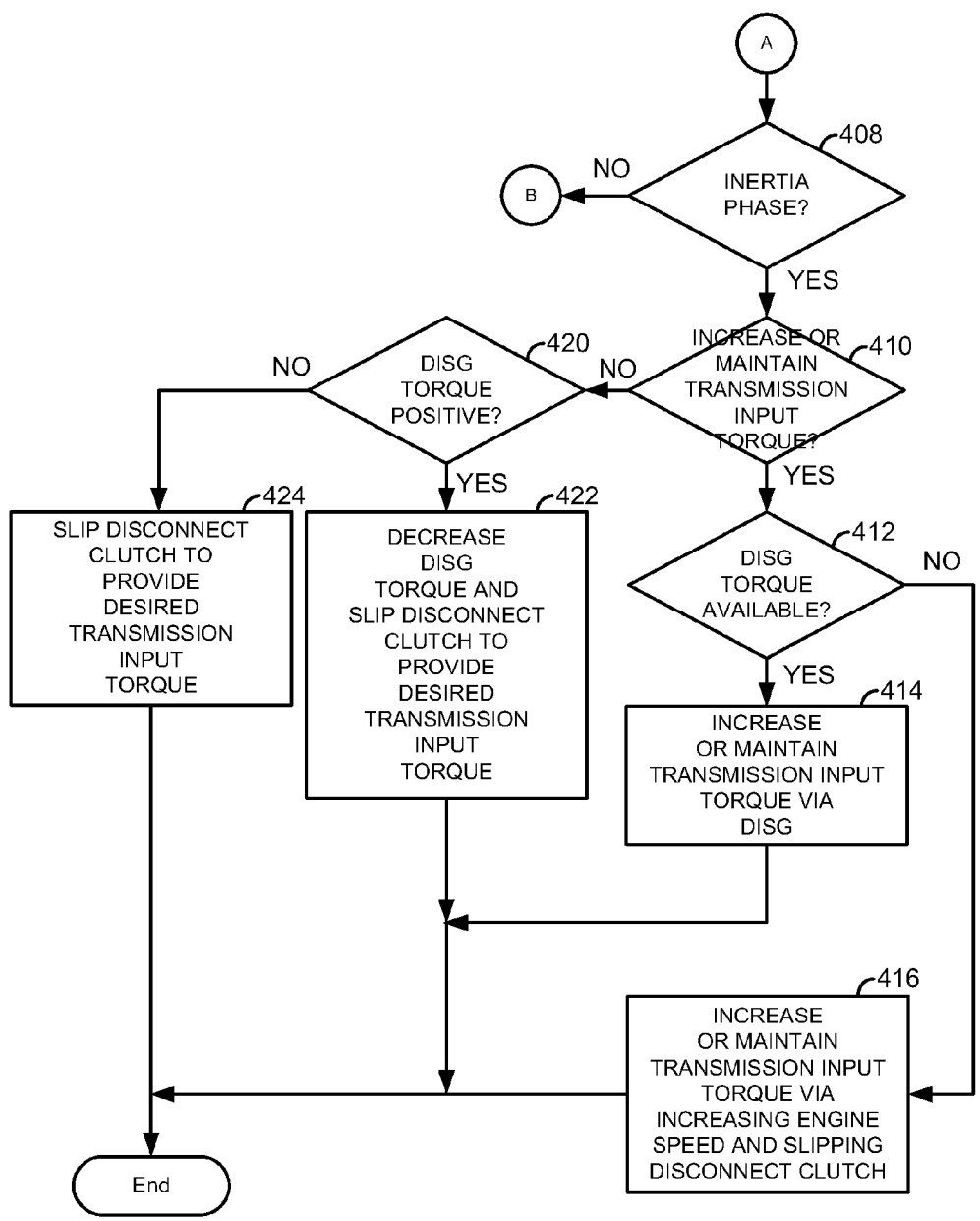

The present description is related to improving hybrid vehicle shifting in the presence of a driveline having a higher inertia. The driveline may include an engine as is shown in FIG. 1. The engine may be mechanically coupled to other vehicle components to form a driveline as is shown in FIG. 2. The driveline may be shifted from a first gear to a second gear as is shown in the sequence of FIG. 3. A method for improving hybrid vehicle transmission shifting is shown in FIGS. 4 and 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; a driveline disconnect clutch selectively coupling the engine and the electric machine; a transmission mechanically coupled to the electric machine; and a controller including executable instructions stored in non-transitory memory for slipping the driveline disconnect clutch in response to entering an inertia phase of a gear shift of the transmission. The driveline system further comprises additional instructions to slip the disconnect clutch in response to entering a torque phase of the gear shift. The driveline system further comprises additional instructions to operate the engine in a speed control mode during the gear shift. The driveline system further comprises additional instructions to increase torque supplied to an input shaft of the transmission during the inertia phase via the electric machine. The driveline system further comprises additional instructions to increase torque supplied to an input shaft of the transmission via increasing engine speed.

The driveline system of claim 15, further comprising additional instructions to decrease torque supplied to an input shaft of the transmission via slipping the driveline disconnect clutch.

Referring now to FIG. 3, an example transmission shifting sequence for a hybrid vehicle is shown. The sequence of FIG. 3 may be provided by the system of FIGS. 1 and 2 executing the method of FIGS. 4 and 5.

The first plot from the top of FIG. 3 is a plot of a shift request versus time. The shift request is asserted when the shift trace is at a higher level near the Y axis arrow. The shift request is not asserted when the shift trace is at a lower level near the X axis. The Y axis represents the shift request state. The X axis represents time and time increases from the left side of FIG. 3 to the right side of FIG. 3.

The second plot from the top of FIG. 3 is a plot of disconnect clutch pressure versus time. The Y axis represents disconnect clutch pressure and disconnect clutch pressure increases in the direction of the Y axis. The X axis represents time and time increases from the left side of FIG. 3 to the right side of FIG. 3.

The third plot from the top of FIG. 3 is a plot of off-going clutch pressure versus time. The Y axis represents off-going clutch pressure and of going clutch pressure increases in the direction of the Y axis. The X axis represents time and time increases from the left side of FIG. 3 to the right side of FIG. 3.

The fourth plot from the top of FIG. 3 is a plot of on-coming clutch pressure versus time. The Y axis represents on-coming clutch pressure and on-coming clutch pressure increases in the direction of the Y axis. The X axis represents time and time increases from the left side of FIG. 3 to the right side of FIG. 3.

The fifth plot from the top of FIG. 3 is a plot of DISG torque versus time. The Y axis represents DISG torque and DISG torque increases in the direction of the Y axis. The X axis represents time and time increases from the left side of FIG. 3 to the right side of FIG. 3.

At time T0 the shift request is not asserted and the driveline disconnect clutch pressure is high indicating that a shift is not requested and the driveline disconnect clutch is closed. The off-going clutch pressure is also high and the on-coming clutch pressure is low indicating that the shifting clutches have not started to change operating state. The DISG torque is at a middle level supplying positive torque to the driveline.

At time T1, the shift request is asserted to initiate an upshift from a lower gear to a higher gear (e.g., from $2^{nd}$ gear to $3^{rd}$ gear). The shift request may be asserted in response to vehicle speed and driver demand torque. The disconnect clutch pressure remains at a higher level and the off-going clutch pressure begins to be reduced in response to the shift request. Additionally, the on-coming clutch pressure is increased to charge the on-coming clutch and to begin to apply the on-coming clutch. The DISG torque remains at its previous level. The time between T1 and T2 may be referred to as the shift preparation time.

At time T2, the shift enters its torque phase. The torque phase may begin when the transmission output shaft torque begins to decline (not shown), or alternatively, when the on-coming clutch pressure is increasing and slip or pressure of the off-going clutch is at a first predetermined level, but before the off-going clutch is fully released. The DISG torque is increased at time T2 in response to entering the torque phase. By increasing DISG torque during the torque phase, torque at the transmission output may be maintained closer to transmission torque at the time the shift request was asserted. The disconnect clutch pressure remains at a higher level.

At time T3, the shift enters an inertia phase. The inertia phase begins at the end of the torque phase. The inertia phase may start at a time at which transmission output shaft torque has increased to the transmission output torque that was present at the time when the shift request was asserted during the shift, or alternatively, the inertia phase may begin when on-coming clutch pressure is greater than a threshold pressure and the off-going clutch slip or pressure is at a second predetermined level, the second predetermined level greater than the first predetermined level if considering off-going clutch slip, the second predetermined level less than the first predetermined level if considering off-going clutch pressure.

During the inertia phase, the disconnect clutch slip may be increased while simultaneously reducing the DISG torque. Further, the disconnect clutch pressure is reduced to increase disconnect clutch slip. By decreasing DISG torque and slipping the disconnect clutch, it may be possible to reduce input torque supplied to the transmission and to reduce inertia upstream of the transmission. In particular, at least partially opening the disconnect clutch decouples the engine from the driveline, thereby reducing driveline inertia upstream of the transmission input shaft. At least partially opening the disconnect clutch also reduces the driveline disconnect clutch output torque, and simultaneously reducing the DISG torque, which is additive with the driveline disconnect clutch output torque allows the system to further reduce transmission input torque.

At time T4, the on-coming clutch pressure is at a higher level and the on-coming clutch has applied the new gear. The shift request is not asserted, thereby indicating the end of the gear shift. The disconnect clutch pressure is shown increasing to reduce disconnect clutch slip and the DISG torque may be increased to supplement engine torque to meet driver demand torque.

In this way, a DISG and disconnect clutch may be operated in different shift phases to reduce driveline inertia and smooth driveline torque during a transmission gear shift. The DISG torque is shown increasing during the torque phase to reduce a decline in transmission output shaft torque. Slip of the driveline disconnect clutch is shown increasing during the inertia phase to reduce driveline inertia upstream of the transmission input shaft.

Referring now to FIGS. 4 and 5, an example method for improving transmission shifting is shown. The method of FIGS. 4 and 5 may be stored as executable instructions in non-transitory memory of the system shown in FIGS. 1 and 2. The method of FIGS. 4 and 5 may provide the sequence shown in FIG. 3.

At 402, method 400 determines vehicle operating conditions. Vehicle operating conditions may include but are not limited to present and requested transmission gears, vehicle speed, driver demand torque, driveline disconnect clutch pressure, transmission clutch pressure, DISG torque, transmission input shaft speed, engine speed, and engine torque. Method 400 proceeds to 404 after vehicle operating conditions are determined.

At 404, method 400 judges whether or not a transmission gear shift is being requested. A transmission gear shift may be requested in response to vehicle conditions including but not limited to vehicle speed and driver demand torque. Additionally, method 400 may begin to charge and apply the on-coming clutch and release the off-going clutch at the start of the gear shift. If method 400 judges that a gear shift of a stepped ratio transmission is requested, the answer is yes and method 400 proceeds to 406. Otherwise, the answer is not and method 400 exits.

At 406, method 400 judges whether or not the gear shift has entered a torque phase of the gear shift. The torque phase may begin when the transmission output shaft torque begins to decline, or alternatively, when the on-coming clutch pressure is increasing and slip or pressure of the off-going clutch is at a first predetermined level, but before the off-going clutch is fully released. If method 400 judges that the gear shift has entered the torque phase, the answer is yes and method 400 proceeds to 450. Otherwise, the answer is no and method 400 proceeds to 408.

At 408, method 400 judges whether or not the gear shift has entered an inertia phase of the gear shift. The inertia phase begins at the end of the torque phase. The inertia phase may start at a time at which transmission output shaft torque has increased to the transmission output torque that was present at the time when the shift request was asserted during the shift, or alternatively, the inertia phase may begin when on-coming clutch pressure is greater than a threshold pressure and the off-going clutch slip or pressure is at a second predetermined level, the second predetermined level greater than the first predetermined level if considering off-going clutch slip, the second predetermined level less than the first predetermined level if considering off-going clutch pressure. If method 400 judges that the gear shift has entered the inertia phase, the answer is yes and method 400 proceeds to 412. Otherwise, the answer is no and method 400 proceeds to 420.

At 410, method 400 judges whether to increase or maintain transmission input torque. In one example, transmission input shaft torque is increased or maintained during an inertia phase of a transmission gear shift during a downshift from a higher gear to a lower gear (e.g., a shift from $3^{rd}$ gear to $2^{nd}$ gear). On the other hand, transmission input shaft torque may be decreased during an inertia phase of a transmission gear shift during a gear upshift (e.g., a shift from $2^{nd}$ to $3^{rd}$ gear). If method 400 judges to increase or maintain transmission input shaft torque, the answer is yes and method 400 proceeds to 412. Otherwise, the answer is no and method 400 proceeds to 420.

At 412, method 400 judges whether or not DISG torque is available. In one example, method 400 may judge DISG torque is available only when DISG speed is less than a DISG speed where the DISG transitions from outputting a constant maximum torque to outputting a constant maximum power. Further, method 400 may judge that DISG torque is available if the present torque output by the DISG is less than the DISG torque capacity. If method 400 judges that DISG torque is available, the answer is yes and method 400 proceeds to 414. Otherwise, the answer is no and method 400 proceeds to 416.

At 414, method 400 increases or maintains transmission input shaft torque via increasing DISG torque. DISG torque may be increased by supplying additional current to the DISG. The amount of torque applied to the transmission input shaft may be based on driver demand torque as determined from accelerator pedal position and vehicle speed. Further, the DISG torque increase during an inertia phase of a transmission gear shift may be empirically determined and stored in memory based on the gear being shifted into and driver demand torque. In this way, method 400 may increase transmission input shaft torque without slipping the driveline disconnect clutch. However, in some examples, DISG torque may be increased as driveline slip is increased while engine speed is increased to provide additional transmission input shaft torque, for example when DISG torque is limited. Method 400 proceeds to exit after increasing or maintaining the transmission input shaft torque during the inertia phase of a gear shift.

At 416, method 400 increases or maintains transmission input shaft torque during an inertia phase by operating an engine in speed control mode (e.g., engine torque is adjusted to maintain a desired engine speed) and increasing slip of the driveline disconnect clutch. The engine speed is increased to a speed greater than transmission input shaft speed and the driveline disconnect clutch is slipped to increase transmission input shaft torque. In one example, engine speed is increased to an empirically determined value stored in memory and driveline disconnect clutch slip is adjusted based on a driveline disconnect working fluid pressure that is stored in memory. The transmission input shaft torque is increased while the disconnect clutch is slipping because the engine speed is greater than transmission input shaft speed. Method 400 proceeds to exit after transmission input shaft torque is increased or maintained.

At 420, method 400 judges whether or not DISG torque is positive and being applied to the driveline. In one example, method 400 may judge DISG torque is positive when the DISG is being supplied with current. If method 400 judges that DISG torque is positive, the answer is yes and method 400 proceeds to 422. Otherwise, the answer is no and method 400 proceeds to 424.

At 422, method 400 decreases transmission input shaft torque via decreasing DISG torque. DISG torque may be decreased by reducing current supplied to the DISG. The amount of torque applied to the transmission input shaft may be based on driver demand torque as determined from accelerator pedal position and vehicle speed. Further, the DISG torque decrease during an inertia phase of a transmission gear shift may be empirically determined and stored in memory based on the gear being shifted into and driver demand torque. Transmission input shaft torque may be decreased during an inertia phase of a transmission gear shift during a gear upshift (e.g., from $2^{nd}$ gear to $3^{rd}$ gear). Method 400 proceeds to exit after decreasing the transmission input shaft torque during the inertia phase of a gear shift.

At 424, method 400 decreases transmission input shaft torque during an inertia phase by increasing slip of the driveline disconnect clutch. Additionally, the engine speed is may be decreased or maintained while the driveline disconnect clutch is slipped to decrease transmission input shaft torque. Method 400 proceeds to exit after transmission input shaft torque is decreased via increasing driveline disconnect slip.

At 450, method 400 judges whether to increase or maintain transmission input torque. In one example, transmission input shaft torque is increased or maintained during a torque phase of a transmission gear shift during a upshift from a lower gear to a higher gear (e.g., a shift from $2^{nd}$ gear to $3^{rd}$ gear). On the other hand, transmission input shaft torque may be decreased during a torque phase of a transmission gear shift during a gear downshift (e.g., a shift from $3^{rd}$ to $2^{nd}$ gear). If method 400 judges to increase or maintain transmission input shaft torque, the answer is yes and method 400 proceeds to 452. Otherwise, the answer is no and method 400 proceeds to 460.

At 452, method 400 judges whether or not DISG torque is available. In one example, method 400 may judge DISG torque is available only when DISG speed is less than a DISG speed where the DISG transitions from outputting a constant maximum torque to outputting a constant maximum power. Further, method 400 may judge that DISG torque is available if the present torque output by the DISG is less than the DISG torque capacity (e.g., maximum DISG torque). If method 400 judges that DISG torque is available, the answer is yes and method 400 proceeds to 454. Otherwise, the answer is no and method 400 proceeds to 456.

At 454, method 400 increases or maintains transmission input shaft torque via increasing DISG torque. DISG torque may be increased by supplying additional current to the DISG. The amount of torque applied to the transmission input shaft may be based on driver demand torque as determined from accelerator pedal position and vehicle speed. Further, the DISG torque increases during a torque phase of a transmission gear shift may be empirically determined and stored in memory based on the gear being shifted into and driver demand torque. In this way, method 400 may increase transmission input shaft torque without slipping the driveline disconnect clutch. However, in some examples, DISG torque may be increased as driveline slip is increased while engine speed is increased to provide additional transmission input shaft torque, for example when DISG torque is limited. Method 400 proceeds to exit after increasing or maintaining the transmission input shaft torque during the torque phase of a gear shift.

At 456, method 400 increases or maintains transmission input shaft torque during a torque phase by operating an engine in speed control mode (e.g., engine torque is adjusted to maintain a desired engine speed) and increasing slip of the driveline disconnect clutch. The engine speed is increased to a speed greater than transmission input shaft speed and the driveline disconnect clutch is slipped to increase transmission input shaft torque. In one example, engine speed is increased to an empirically determined value stored in memory and driveline disconnect clutch slip is adjusted based on a driveline disconnect working fluid pressure that is stored in memory. The transmission input shaft torque is increased while the disconnect clutch is slipping because the engine speed is greater than transmission input shaft speed. Method 400 proceeds to exit after transmission input shaft torque is increased or maintained.

At 460, method 400 judges whether or not DISG torque is positive and being applied to the driveline. In one example, method 400 may judge DISG torque is positive when the DISG is being supplied with current. If method 400 judges that DISG torque is positive, the answer is yes and method 400 proceeds to 462. Otherwise, the answer is no and method 400 proceeds to 464.

At 462, method 400 decreases transmission input shaft torque via decreasing DISG torque. DISG torque may be decreased by reducing current supplied to the DISG. The amount of torque applied to the transmission input shaft may be based on driver demand torque as determined from accelerator pedal position and vehicle speed. Further, the DISG torque decrease during a torque phase of a transmission gear shift may be empirically determined and stored in memory based on the gear being shifted into and driver demand torque. Transmission input shaft torque may be decreased during a torque phase of a transmission gear shift during a gear downshift (e.g., from $3^{rd}$ gear to $2^{nd}$ gear). Method 400 proceeds to exit after decreasing the transmission input shaft torque during the torque phase of a gear shift.

At 464, method 400 decreases transmission input shaft torque during a torque phase by increasing slip of the driveline disconnect clutch. Additionally, the engine speed is may be decreased or maintained while the driveline disconnect clutch is slipped to decrease transmission input shaft torque. Method 400 proceeds to exit after transmission input shaft torque is decreased via increasing driveline disconnect slip.

Thus, the method of FIGS. 4 and 5 provides for a driveline method, comprising: in response to a transmission gear shift request, increasing transmission input shaft torque via an electric machine when electric machine speed is less than a threshold speed during a torque phase of the transmission gear shift; and decreasing transmission input shaft torque via slipping a driveline disconnect clutch and reducing output torque of the electric machine during an inertia phase of the transmission gear shift. The method includes where the threshold speed is a speed where the electric machine transitions from providing a constant maximum torque to providing a constant maximum power.

In some examples, the method further comprises increasing transmission input shaft torque during the torque phase of the transmission gear shift via increasing engine speed and increasing slip of the driveline disconnect clutch at electric machine speeds greater than the threshold speed. The method includes where the engine is operated in a speed control mode during the torque phase of the transmission gear shift. The method includes where the transmission gear shift is an upshift. The method further comprises increasing transmission input shaft torque via increasing engine speed and slipping the driveline disconnect clutch while increasing transmission input shaft torque via the electric machine. The method includes where the engine speed is increased and the driveline disconnect clutch is slipped in response to the electric machine having insufficient capacity to provide a desired transmission input shaft torque during the torque phase.

The method of FIGS. 4 and 5 also provides for a driveline method, comprising: in response to a transmission gear shift request, decreasing transmission input shaft torque via an electric machine without slipping a driveline disconnect clutch during a torque phase of the transmission gear shift; and increasing transmission input shaft torque via slipping a driveline disconnect clutch during an inertia phase of the transmission gear shift. The method further comprises increasing an engine speed during the gear shift and increasing torque transferred via the driveline disconnect clutch during the inertia phase. The method includes where the engine is operated in a speed control mode during the inertia phase.

In some examples, the method further comprises decreasing the transmission input shaft torque via slipping the driveline disconnect clutch during the torque phase of the transmission shift. The method further comprises increasing torque output from the electric machine during the inertia phase. The method includes where the transmission shift is a downshift from a higher gear to a lower gear. The method also includes where the electric machine is mechanically coupled to the driveline disconnect clutch upstream of a transmission.

As will be appreciated by one of ordinary skill in the art, the methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system. In the context of this disclosure, a limit is a value or threshold that is not to be exceeded or a value or threshold other parameters are prevented from going above. A maximum is a value or threshold which parameters associated with the maximum are maintained below at all times the maximum is in effect. For example, maximum available electric machine torque is a torque threshold below which electric machine torque is maintained while the maximum available electric machine torque is in effect.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
in response to a transmission gear shift request, increasing transmission input shaft torque via an electric machine when electric machine speed is less than a threshold speed during a torque phase of the transmission gear shift;
decreasing transmission input shaft torque via slipping a driveline disconnect clutch and reducing output torque of the electric machine during an inertia phase of the transmission gear shift; and
increasing transmission input shaft torque during the torque phase of the transmission gear shift via increasing engine speed and increasing slip of the driveline disconnect clutch at electric machine speeds greater than the threshold speed.

2. The method of claim 1, where the threshold speed is a speed where the electric machine transitions from providing a constant maximum torque to providing a constant maximum power.

3. The method of claim 1, where an engine is operated in a speed control mode during the torque phase of the transmission gear shift.

4. The method of claim 1, where the transmission gear shift is an upshift.

5. The method of claim 1, where the engine speed is increased and the driveline disconnect clutch is slipped in response to the electric machine having insufficient available torque to provide a desired transmission input shaft torque during the torque phase.

6. A driveline method, comprising:
in response to a transmission gear shift request, decreasing transmission input shaft torque via an electric machine without slipping a driveline disconnect clutch during a torque phase of the transmission gear shift; and
increasing transmission input shaft torque via decreasing a pressure of a driveline disconnect clutch and slipping the driveline disconnect clutch during an inertia phase of the transmission gear shift.

7. The method of claim 6, further comprising increasing an engine speed during the gear shift and increasing torque transferred via the driveline disconnect clutch during the inertia phase.

8. The method of claim 7, where an engine is operated in a speed control mode during the inertia phase.

9. The method of claim 6, further comprising decreasing the transmission input shaft torque via slipping the driveline disconnect clutch during the torque phase of the transmission shift.

10. The method of claim 6, further comprising increasing torque output from the electric machine during the inertia phase.

11. The method of claim 6, where the transmission shift is a downshift from a higher gear to a lower gear.

12. The method of claim 6, where the electric machine is mechanically coupled to the driveline disconnect clutch upstream of a transmission.

13. A driveline system, comprising:
an engine;
an electric machine;
a driveline disconnect clutch selectively coupling the engine and the electric machine;
a transmission mechanically coupled to the electric machine; and
a controller including executable instructions stored in non-transitory memory for decreasing a pressure of the driveline disconnect clutch and slipping the driveline disconnect clutch in response to entering an inertia phase of a gear shift of the transmission.

14. The driveline system of claim 13, further comprising additional instructions to slip the disconnect clutch in response to entering a torque phase of the gear shift.

15. The driveline system of claim 14, further comprising additional instructions to operate the engine in a speed control mode during the gear shift.

16. The driveline system of claim 15, further comprising additional instructions to increase torque supplied to an input shaft of the transmission during the inertia phase via the electric machine.

17. The driveline system of claim 14, further comprising additional instructions to increase torque supplied to an input shaft of the transmission via increasing engine speed.

18. The driveline system of claim 13, further comprising additional instructions to decrease torque supplied to an input shaft of the transmission via slipping the driveline disconnect clutch.

19. A driveline method, comprising:
in response to a transmission gear shift request, increasing transmission input shaft torque via an electric machine when electric machine speed is less than a threshold speed during a torque phase of the transmission gear shift;
decreasing transmission input shaft torque via slipping a driveline disconnect clutch and reducing output torque of the electric machine during an inertia phase of the transmission gear shift; and
increasing transmission input shaft torque via increasing engine speed and slipping the driveline disconnect clutch while increasing transmission input shaft torque via the electric machine.

20. A driveline method, comprising:
in response to a transmission gear shift request, increasing transmission input shaft torque via an electric machine when electric machine speed is less than a threshold speed during a torque phase of the transmission gear shift; and
decreasing transmission input shaft torque via slipping a driveline disconnect clutch and reducing output torque of the electric machine during an inertia phase of the transmission gear shift, where engine speed is increased and the driveline disconnect clutch is slipped in response to the electric machine having insufficient available torque to provide a desired transmission input shaft torque during the torque phase.

* * * * *